United States Patent [19]

Hofmann et al.

[11] Patent Number: 4,958,944
[45] Date of Patent: Sep. 25, 1990

[54] BEARING FOR WHEEL MOUNT

[75] Inventors: Heinrich Hofmann, Schweinfurt; Manfred Tröster, Bad Kissingen, both of Fed. Rep. of Germany

[73] Assignee: FAG Kugelfischer Georg Schafer (KGaA), Fed. Rep. of Germany

[21] Appl. No.: 454,073

[22] Filed: Dec. 21, 1989

[30] Foreign Application Priority Data

Jan. 25, 1989 [DE] Fed. Rep. of Germany ....... 3902141

[51] Int. Cl.$^5$ .............................................. F16C 33/58
[52] U.S. Cl. .................................. 384/512; 384/537; 384/539; 384/544; 384/513
[58] Field of Search ............... 384/537, 512, 506, 544, 384/539, 585, 589, 513

[56] References Cited

U.S. PATENT DOCUMENTS

| | | | |
|---|---|---|---|
| 4,179,167 | 12/1979 | Lura et al. ........................... | 384/512 |
| 4,792,244 | 12/1988 | Yamashita et al. ................. | 384/537 |
| 4,835,829 | 6/1989 | Welschof et al. ................... | 384/544 |
| 4,887,917 | 12/1989 | Tröster et al. ...................... | 384/537 |

Primary Examiner—Lenard A. Footland
Attorney, Agent, or Firm—Ostrolenk, Faber, Gerb & Soffen

[57] ABSTRACT

A wheel mount for motor vehicles or the like. An axially inner hub having an axle journal which projects axially outwardly and a first row of ball bearings rolling about the axle journal. A separate inner ring axially outward of the axle journal and having a second row of ball bearings rolling about it. The separate inner ring having a radially widened region on the axially outward side. The internal bore of the separate inner ring progressing from a radially smaller diameter at the widened region over a plurality of steps which have gradually greater inner diameters. The axle journal on the hub extends through the inner ring and has correspondingly shaped steps. The inner ring is force fit over the axle journal. A radially outwardly bulging bead presses on the axially outward end of the separate inner ring and presses that ring against a shoulder of the axle journal.

11 Claims, 1 Drawing Sheet

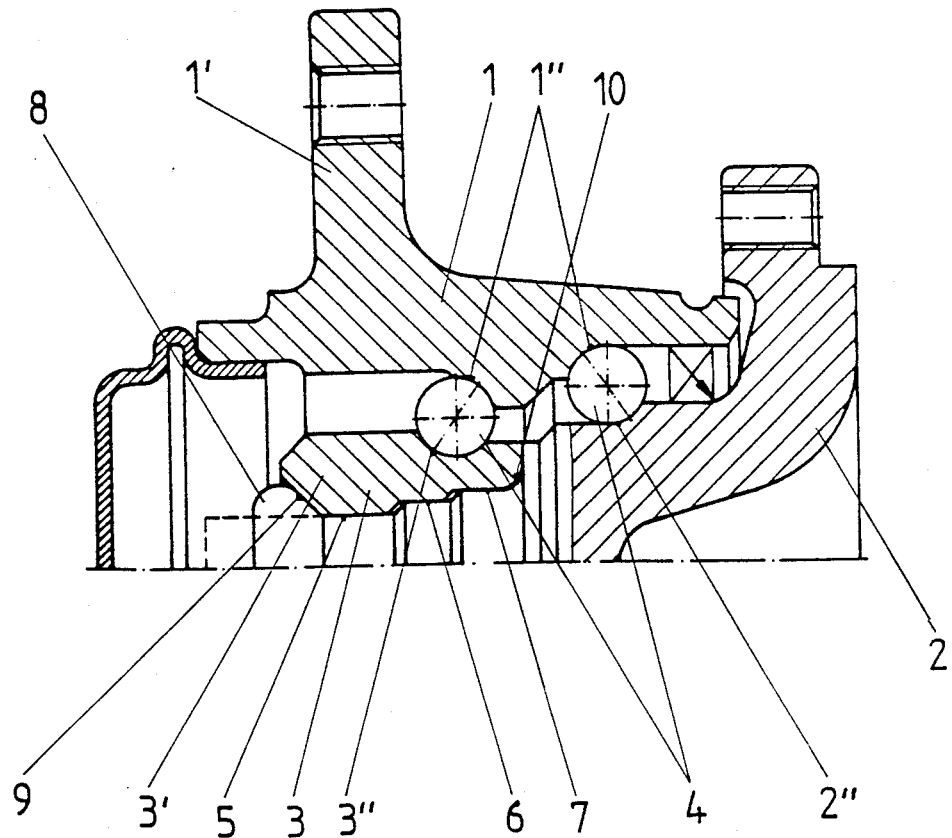

BEARING FOR WHEEL MOUNT

BACKGROUND OF THE INVENTION

The present invention refers to a wheel mount for a motor vehicle, the mount having a double row, angular contact, ball bearing, and the invention particularly relates to features of the inner ring of the bearing.

A mount of a similar type is seen in Federal Republic of Germany Application No. OS 33 36 796. In the illustrated embodiment, in order to fix the separate inner ring, it is necessary to provide an additional part, in that case in the form of the outer ring of a universal joint housing, and to fasten that additional part by additional individual parts such as a nut and a supporting disk, with the provision of a threaded section. A similar embodiment can be seen in Federal Republic of Germany Pat. No. 28 15 140. In that case, additional parts are also necessary in order to fasten the separate inner ring. In both cases, the many individual parts make assembly of the wheel mount difficult. Furthermore, they require additional space axially. The axial securing is furthermore expensive and risky.

SUMMARY OF THE INVENTION

The object of the present invention is, therefore, to improve a wheel mount for a motor vehicle, or the like, which employs a double row bearing arrangement using rolling elements in the form of ball bearings or tapered roller bearings. Hereafter the invention is described with ball bearings. The inner ring for one of the rows of ball bearings is integrated into the axle journal of the hub of the wheel mount. The other inner ring for the other row of ball bearings is arranged as a separate part and is clamped axially against the axle journal.

The invention has the object of avoiding the above mentioned disadvantages of existing wheel mounts, and to obtain a wheel mount which, using the simplest means and at the smallest possible size, results in a stable hub with, at the same time, a good and secure axial fixing of the separate inner ring on the hub.

This object is achieved with the invention. The second inner ring of the wheel mount is a separate part which is axially clamped against the end of an axle journal and particularly against the shoulder at the end of the axle journal. Generally toward the axially outward side, which is away from the axle journal shoulder, the separate inner ring has a radially widened region, which reduces its bore diameter to give it a smaller inner diameter. Axially inward of the widened region, there are a plurality of gradually larger inner diameter steps formed in the bore. These cooperate with corresponding steps formed on the periphery of the hub part and particularly the pin of the axle journal, which projects into the bore of the separate inner ring to provide support there. The separate inner ring is force fit onto that pin, and the cooperating steps enhance the stability. The force fit between the bore surface of the inner ring and the outer surface of the hub received within the inner ring, which surfaces are opposite each other, decreases in the direction axially inward from the outer step past each of the inner steps.

At its axially outer end, the inner ring preferably faces a radially bulging bead defined on the hub. The bead is at the end of the inner ring opposite the axle shoulder that the inner ring engages, so that the inner ring is securely held on the hub. The exterior of the inner ring and the axle journal are preferably respectively so shaped that the axially inward ball bearing race on the integrated race ring on the hub has a larger diameter than the axially outward inner race defined on the exterior of the separate inner ring.

Since the separate inner ring has a radial widening on the side of the high shoulder of its ball bearing inner race, it is particularly stable in this region. This stability is increased by the several radial steps which are arranged in the region of the bore of that ring, wherein the axially outermost step having the smallest inner diameter. These steps provide an increase in cross section in the radial direction. Furthermore, assembly is facilitated by the steps in the ring bore and by the corresponding steps also arranged on the hub, because the axial displacement distance, which customarily takes place with force fitting, is substantially reduced in this way. This force fit, which must be high because of the good axial fixing desired, will have little negative influence on the inner ball race, since the dimensionally stable inner race will scarcely deform. In addition to this advantage, there is a firm seat of the separate inner ring on the hub.

In the preferred embodiment, three steps are provided in the inner ring. The force fit decreases from the axially outer step toward the inner one. In this way, the firm seat of the inner ring on the hub is further increased without a resulting functionally unfavorable deformation of the inner ring. The highest force fit lies in the most stable ring region, that is in the region of the greatest radial widening. Since the force fit decreases in the direction axially toward the ball race, no impermissible deformation need be feared here.

Despite the good attachment of the inner ring to the hub, in view of the blows and moments which frequently occur in wheel mounts of motor vehicles, it is advisable to provide on the pin of the axle journal a bulged bead which faces the separate inner ring at its axially outer end side. Because the inner ring is held between the bulged head and the axle journal shoulder, axial travel of the inner ring is made impossible. This causes the initial tension conditions in the bearing to always remain the same, which is desirable. This embodiment has the further advantage that it can be manufactured by machine in a simple fashion. Additional parts and expensive assembly are not required.

The wheel mount as a whole can be further reinforced because the inner race or the pitch circle of the axially outward separate inner ring has a smaller diameter than the inner race or pitch circle of the axially inward integrated ring on the axle journal of the hub. This improves conditions at the axial transition between the separate inner ring and the hub. Among other things, a larger rounding radius can be provided on the separate inner ring at the transition, so that the danger of breakage is substantially reduced at this place. Furthermore the adjacent hub part can have a large diameter, which further increases its stability.

As a whole, it can be stated that these features produce a particularly rigid and stable mounting with the smallest dimensions, and the assembly also does not produce any problems.

Other objects and features of the invention are described with reference to the drawings.

BRIEF DESCRIPTION OF THE DRAWING

The drawing Figure represents a partial cross section through a wheel mount having the features in accordance with the invention.

DESCRIPTION OF A PREFERRED EMBODIMENT

The wheel mount is comprised of the outer ring 1, which is provided with an attachment flange 1', the hub 2 and the separate inner ring 3 The hub is axially inward of the inner ring 3. The hub includes a pin that projects axially outward inside the bore of the inner ring 3. There are two outer ball races 1" on the outer ring 1. Between the inner race 2" integrated on the hub 2 and one outer ball race 1", and between the inner race 3" of the inner ring 3 and the other outer ball race 1", two annular rows of bearing balls 4 are provided in respective O-arrangement.

To improve its stability, the inner ring 3 has a radially widened thicker and therefore less easily deformable axially outward end region 3'. Furthermore, axially inward of the widened region 3', three steps 5, 6 and 7 are formed in the inner or bore surface of the inner ring 3. The steps gradually increase in diameter through steps 5, 6 and 7, in the direction axially inwardly. These steps substantially facilitate assembly of the inner ring 3. The hub pin has a complementary surface profiling to that of the bore of the inner ring 3. Despite the widened inner ring 3, only a short displacement path results under force fitting of the hub pin into the inner ring 3. Furthermore, if the force fit is greatest in the region 5, a very good fastening is obtained there. Due to the large cross section of the widened region 3', a stable ring part is also obtained. As a result, deformation is also avoided. Since the force fit decreases in the regions of steps 6 and 7, no deformation takes place despite their being regions of thin ring sections. Furthermore, the assembly is simpler.

The axial fixing of the separate inner ring 3 on the hub 2 is further increased by a bead 8 which is formed by a bulge or bead 8 on the pin of the hub 2. The bead 8 is resilient to deform to fit through the bore of the inner ring 3. The bead 8 then rests against the beveled inner end side 9 of the inner ring 3 under initial tension which provides stability of the mount under operating conditions.

The stability of the entire mount is further increased in that, with constant diameter of the balls 4, the pitch circle of the row of bearing balls at the separate inner ring 3 is smaller than the pitch circle of the other row of balls at the integrated ring on the hub. As a result, the race 2" has a larger diameter than the race 3". In this way, the rounding radius 10 of the end of the ring 3 can be increased, and the hub 2 can be reinforced in the region of the race 2".

Although the present invention has been described in connection with a preferred embodiment thereof, many other variations and modifications will now become apparent to those skilled in the art. It is preferred, therefore, that the present invention be limited not by the specific disclosure herein, but only by the appended claims.

What is claimed is:

1. A wheel mount comprising
an outer ring for defining the outer races of two rows of bearing rolling elements;
an axially more inward axle journal having an exterior periphery which defines a first inner race for one of the rows of rolling elements and cooperating with a respective first one of the outer races defined inside the outer ring;
axially outward of the first inner race, a separate inner ring having an external periphery with a second inner race defined thereon for cooperating with a respective second one of the outer races on the interior of the outer ring for the second row of rolling elements;
The separate inner ring having an axially inner end which is axially pressed against the axle journal; the separate inner ring having an internal bore, and the axle journal including a pin which is generally complementary in shape to the internal bore of the inner ring and projects through the internal bore;
the separate inner ring having a radially widened region at the axially more outward region thereof, and the internal bore of the separate ring having the smallest diameter at the widened region; axially inward of the widened region, the internal bore having defined in it a plurality of steps of gradually greater diameter from step to step axially inward, and the axle journal having cooperating, correspondingly shaped steps defined on it shaped for force fitting the inner ring on the correspondingly shaped axle journal.

2. The wheel mount of claim 1, wherein the inner race of the separate inner ring has shoulders at opposite axial sides of the second row of rolling elements, and the shoulder at the side of the second row of rolling elements that is radially higher is at the axial side toward the widened region of the inner ring.

3. The wheel mount of claim 2, wherein the first inner race on the axle journal has a larger diameter than the second inner race on the separate inner ring, whereby the pitch circle of the first row of rolling elements is greater than the pitch circle of the second row of rolling elements.

4. The wheel mount of claim 1, including a hub on which the axle journal is defined and the hub extending axially inward from the first row of rolling elements.

5. The wheel mount of claim 1, further comprising a radially outwardly bulging bead defined on the hub axially outward of the inner ring, the bead being placed and shaped so as to press against the axially outward end of the separate inner ring while the axially inner end of the separate inner ring presses against the axle journal.

6. The wheel mount of claim 5, wherein the axle journal includes a shoulder axially inward of the separate inner ring and the separate inner ring presses against the axle journal shoulder and on the bead.

7. The wheel mount of claim 5, wherein the first inner race on the axle journal has a larger diameter than the second inner race on the separate inner ring, whereby the pitch circle of the first row of rolling elements is greater than the pitch circle of the second row of rolling elements.

8. The wheel mount of claim 1, wherein the steps in the internal bore of the separate inner ring and the corresponding steps on the axle journal are respectively so shaped so that the force fit between the internal bore surface and the steps of the hub decreases in the direction from the axially outer, smaller diameter step toward the axially inner, greater diameter step.

9. The wheel mount of claim 8 wherein the first inner race on the axle journal has a larger diameter than the second inner race on the separate inner ring, whereby the pitch circle of the first row of rolling elements is greater than the pitch circle of the second row of rolling elements.

10. The wheel mount of claim 1, wherein the first inner race on the axle journal has a larger diameter than the second inner race on the separate inner ring, whereby the pitch circle of the first row of rolling elements is greater than the pitch circle of the second row of rolling elements.

11. The wheel mount of claim 1, wherein the rolling elements comprise angular contact ball bearings in an O-arrangement.

* * * * *